United States Patent
Kitano

(10) Patent No.: US 7,305,318 B2
(45) Date of Patent: Dec. 4, 2007

(54) PROCESS AND SYSTEM FOR DETECTING DECREASE IN TIRE AIR-PRESSURE AND TIRE DEFLATION JUDGING PROGRAM

(75) Inventor: Masashi Kitano, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/481,106

(22) Filed: Jul. 6, 2006

(65) Prior Publication Data

US 2007/0010964 A1    Jan. 11, 2007

(30) Foreign Application Priority Data

Jul. 8, 2005    (JP)    ............... 2005-200492

(51) Int. Cl.
G06F 19/00    (2006.01)
(52) U.S. Cl. .............. 702/148; 702/138; 702/185
(58) Field of Classification Search ............. 702/138, 702/142, 145, 146, 163, 185, 189; 73/146.8, 73/146.3, 146.4, 146.5, 146.6; 340/442, 340/447, 444; 701/31, 36, 99
See application file for complete search history.

(56) References Cited

U.S. PATENT DOCUMENTS

| | | | | |
|---|---|---|---|---|
| 4,876,528 A | | 10/1989 | Walker et al. | |
| 5,569,848 A | * | 10/1996 | Sharp | ............... 73/146.2 |
| 5,721,374 A | * | 2/1998 | Siekkinen et al. | ............ 73/146.2 |
| 5,826,210 A | * | 10/1998 | Izumi et al. | ............ 701/70 |
| 5,895,846 A | | 4/1999 | Chamussy et al. | |
| 5,940,781 A | * | 8/1999 | Nakajima | ............ 702/98 |
| 6,215,393 B1 | * | 4/2001 | Delaporte | ............ 340/447 |

(Continued)

FOREIGN PATENT DOCUMENTS

EP    0 872 362 A2    10/1998

(Continued)

OTHER PUBLICATIONS

Mayer, 'Comparative Diagnosis of Tyre Pressures', 1994, IEEE Publication, pp. 627-632.*

(Continued)

*Primary Examiner*—Hal Wachsman
*Assistant Examiner*—Elias Desta
(74) *Attorney, Agent, or Firm*—Birch, Stewart, Kolasch & Birch, LLP

(57) ABSTRACT

A judgment whether a decrease in tire air-pressure occurs or not is performed by a process comprising the steps of: detecting information on wheel rotational velocities of tires; obtaining a judgment value for decrease in tire air-pressure based on relative comparison between the detected information on wheel rotational velocities; storing the judgment value(s) into an average preparation buffer BF; obtaining an average value of the judgment value(s) stored in the average preparation buffer BF when the vehicle stops; writing the average value and the number of the judgment values into a nonvolatile memory $2e$; expanding the average value written in the nonvolatile memory $2e$ into the average preparation buffer BF in duplicate corresponding to the number of the judgment values after the start of a drive of the vehicle; and calculating an average value of a prescribed number of judgment values stored in the average preparation buffer BF so as to compare the average value with a threshold value.

7 Claims, 5 Drawing Sheets

U.S. PATENT DOCUMENTS

| | | | |
|---|---|---|---|
| 6,388,568 B1 * | 5/2002 | Arita et al. | 340/442 |
| 6,486,776 B1 * | 11/2002 | Pollack et al. | 340/521 |
| 6,683,537 B2 * | 1/2004 | Starkey et al. | 340/870.16 |
| 7,010,968 B2 * | 3/2006 | Stewart et al. | 73/146 |
| 7,076,999 B1 * | 7/2006 | Knox | 73/146.3 |
| 2004/0111198 A1 | 6/2004 | Kin et al. | |

FOREIGN PATENT DOCUMENTS

| | | |
|---|---|---|
| JP | 63-305011 A | 12/1988 |
| JP | 7-40717 A | 2/1995 |
| JP | 9-203679 A | 8/1997 |
| JP | 9-207528 A | 8/1997 |
| JP | 2002-19435 A | 1/2002 |
| JP | 2003-260910 A | 9/2003 |

OTHER PUBLICATIONS

Gustafsson et al., 'Virtual Sensors of Tire Pressure and Road Firction', 2001, SOAE Publicaiton, pp. 1-7.*

* cited by examiner

PROCESS AND SYSTEM FOR DETECTING DECREASE IN TIRE AIR-PRESSURE AND TIRE DEFLATION JUDGING PROGRAM

BACKGROUND OF THE INVENTION

1. Field of the Invention

The present invention relates to a process and a system for detecting decrease in tire air-pressure and a tire deflation judging program. More particularly, it relates to a process and system for detecting decrease in tire air-pressure and a tire deflation judging program with which it is possible to detect decreases in air-pressure of tires with good accuracy even in cases where a drive of a vehicle is repeated in a short duration of time (here, the "drive" refers to a period from the start of the engine to the turn-off thereof).

2. Description of the Related Art

A system for detecting decrease in tire air-pressure employs a theory that a wheel velocity or a rotational angular velocity of a tire with a decreased air-pressure is increased when compared to a tire with a normal internal pressure due to a decrease in outer diameter (dynamic load radius of the tire) from that of a tire with a normal internal pressure. In a method for detecting decrease in internal pressure on the basis of a relative difference in wheel velocity, DEL={(V1+V4)/2−(V2+V3)/2}/{(V1+V2+V3+V4)/4}.times.100(%) is employed as a judgment value (reference should be made to Patent Document 1). Here, V1 to V4 denote rotational angular velocities of a front left tire, a front right tire, a rear left tire and a rear right tire, respectively.

By the way, the foregoing judgment value determined on the basis of a relative difference in wheel velocity of the tires somewhat varies depending on the driving conditions of the vehicle.

For this reason, in the conventional system for detecting decrease in tire air-pressure, an average value obtained by taking the average of relative difference values that are obtained during a predetermined consecutive period of time, for example, 5 seconds is employed as a judgment value and the average of a prescribed number (e.g. 6)of the judgment values is calculated so that a detection of a decrease in tire air-pressure is accomplished by judging whether the average value exceeds a predetermined threshold value or not.

However, when the foregoing detection of decrease in tire air-pressure is applied to a case where a short distance travel of a vehicle (for example, postal truck) that completes within 30 seconds or less is repeated, since there is no chance to calculate an average value even when the judgment value exceeds the threshold value, it is impossible to detect the decrease of air-pressure even if a decrease in air-pressure occurs to a tire.

For this reason, it is arranged such that obtained judgment values are stored in a nonvolatile memory so as to enable calculation of the average value even when a drive of a vehicle is discontinued by using judgment values obtained during the drive before it is discontinued together with judgment values obtained during the subsequent drive.

[Patent document 1] Japanese Unexamined Patent Publication No. S63-305011

[Patent document 2] Japanese Unexamined Patent Publication No. 2002-19435

Conventionally, a memory having a prescribed number of data areas required for taking an average is used as the nonvolatile memory for the foregoing average calculations. This leads to the problem that as the prescribed number of data areas increases, a redundant capacity is required for the nonvolatile memory, causing the size of the memory construction to be larger than is necessary.

SUMMARY OF THE INVENTION

It is therefore an object of the present invention to provide a process and a system for detecting decrease in tire air-pressure and a tire deflation judging program which allow the memory construction of a nonvolatile memory to be minimized.

A process of detecting decrease in tire air-pressure according to the present invention comprises the steps of:

detecting information on wheel rotational velocities of the respective tires; obtaining a judgment value for decrease in tire air-pressure based on a relative comparison between the obtained information on the wheel rotational velocities; storing the judgment value in an average preparation buffer; calculating an average value of an arbitrary number of judgment values stored in the average preparation buffer to write the average value and the number of judgment values into a nonvolatile memory at a predetermined timing; expanding the average value that is written into the nonvolatile memory into the average preparation buffer in duplicate corresponding to the number of judgment values; and calculating an average value of a prescribed number of judgment values that are stored in the average preparation buffer to compare the average value with a threshold value, thereby judging whether a decrease in tire air-pressure occurs or not.

According to the present invention, the number of data to be written into the nonvolatile memory is two including the average value and the number of samples, which are the required minimum data set. For this reason, only a minimum capacity is required for the nonvolatile memory itself, which enables reduction of the size of the memory construction from that of the conventional memory construction.

When the foregoing predetermined timing is set to be when a drive of the vehicle is completed, the frequency of writing data into the nonvolatile memory can be reduced as compared with the conventional case where every judgment value is written into the nonvolatile memory upon acquirement thereof. The life of the nonvolatile memory can therefore be prolonged.

When the timing at which the average value written into the nonvolatile memory is expanded into the average preparation buffer in duplicate corresponding to the number of judgment values is set to be after the start of the subsequent drive, even when a drive is discontinued, calculation of the average value is possible upon judgment values that are obtained during the drive before it is discontinued together with judgment values calculated during the subsequent drive.

A system for detecting decrease in tire air-pressure according to the present invention comprises: rotational velocity sensors for detecting information on wheel rotational velocities of the respective tires; judgment value calculating means for obtaining a judgment value for decrease in tire air-pressure based on a relative comparison between the detected information on wheel rotational velocities; an average preparation buffer for storing the judgment values; a nonvolatile memory into which an average value of the judgment values and the number of samples are written; writing means for writing the average value of an arbitrary number of judgment values stored in the average preparation buffer and the number thereof into the nonvolatile memory at a predetermined timing; expanding means for expanding the average value written in the nonvolatile memory into the average preparation buffer in duplicate corresponding to the number of judgment values; and judging means for obtaining an average value of a prescribed number of judgment values stored in the average preparation buffer to compare the average value with a threshold value, thereby judging whether a decrease in tire air-pressure occurs or not.

A tire deflation judging program according to the present invention is a program used in a computer for detecting a decrease in tire air-pressure based on information on wheel rotational velocities obtained from rotational velocity sensors of tires mounted on a vehicle, comprising judgment value calculating means; an average preparation buffer; a nonvolatile memory; writing means; expanding means; and judging means, which are all prescribed in the foregoing.

These and other advantages, features and effects of the present invention will be made apparent by the following description of a preferred embodiment with reference to the accompanying drawings.

DETAILED DESCRIPTION OF PREFERRED EMBODIMENTS

Figure 1:
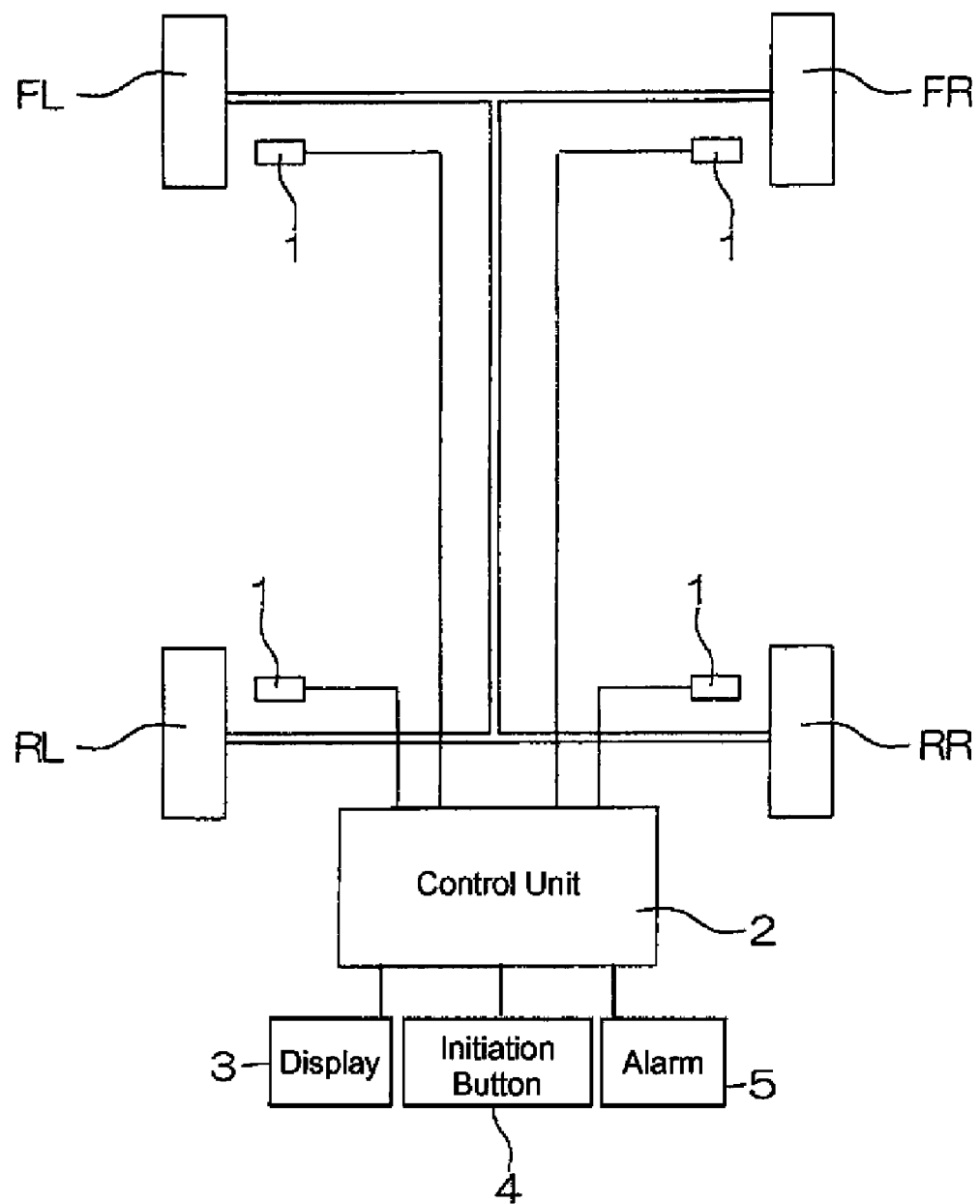
FIG. 1 is a block diagram showing an system for detecting decrease in tire air-pressure according to one embodiment of the present invention.

FIG. 1 is a diagram showing an arrangement of a system for detecting decrease in tire air-pressure according to one embodiment of the present invention.

The system for detecting decrease in tire air-pressure detects whether a decrease in air-pressure occurs or not in four tires FL, FR, RL and RR mounted on a vehicle, and includes rotational velocity sensors 1 provided in relation to the respective tires.

The rotational velocity sensor 1 might be a wheel speed sensor for measuring wheel speeds on the basis of the number of pulses upon generating wheel rotational pulses by using an electromagnetic pickup or similar, or a wheel angular velocity sensor in which electric power is generated by utilizing rotation of the tire as in a dynamo, whereupon the rotational angular velocity is measured based upon the voltage of the generated power.

Outputs of the rotational velocity sensors 1 are sent to a control unit 2. A computer for an ABS (Anti Brake System) can be employed for the control unit 2. A display 3 comprising a liquid crystal display device, plasma display device or CRT for notifying of tires with decreased pressures, an initiation button 4 which can be operated by a driver and an alarm 5 are connected to the control unit 2.

Figure 2:
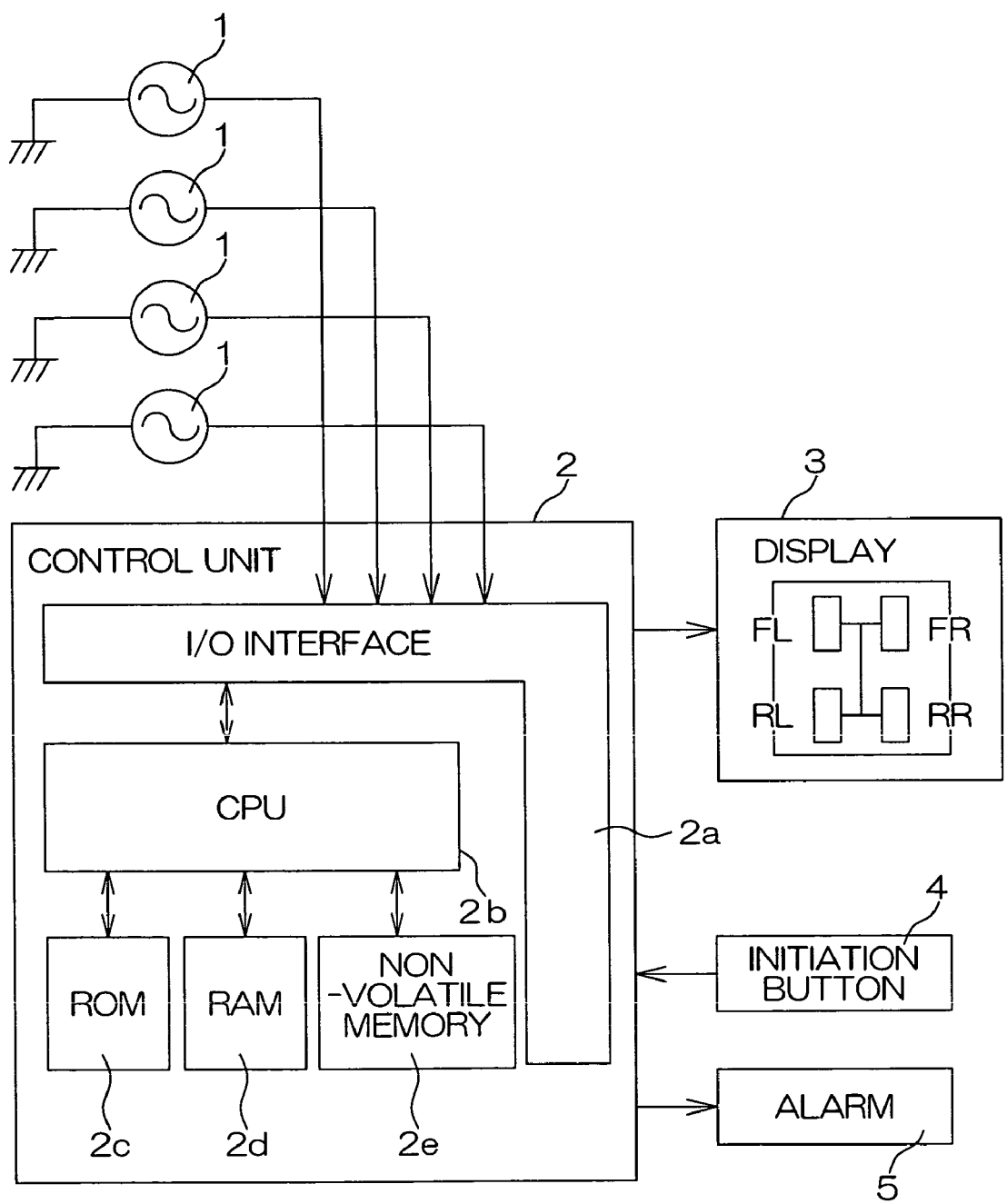
FIG. 2 is a block diagram showing an electrical arrangement of the system for detecting decrease in tire air-pressure in FIG. 1.

The control unit 2 comprises, as illustrated in FIG. 2, an I/O interface 2a required for sending/receiving signals to/from an external device, a CPU2b which functions as the center of calculation, a ROM2c which stores a control operation program for the CPU2b, a RAM2d into which data are temporarily written and are read out therefrom when the CPU2b performs control operations. In addition, the control unit 2 includes a nonvolatile memory 2e into which the later described judgment values are stored.

Pulse signals corresponding to the number of rotations of tires (hereinafter referred to as "wheel speed pulses") are output from the rotational velocity sensors 1. In the CPU2b, rotational angular velocities Fi (i=1, 2, 3,4) of the respective tires are calculated based on the wheel speed pulses output from the rotational velocity sensors 1 at every predetermined sampling period $\Delta T$ (second), for example, every $\Delta T=1$ second. Here, F1, F2, F3 and F4 represent rotational angular velocities of the front left tire, front right tire, rear left tire and rear right tire, respectively.

Incidentally, since the tires are manufactured to include variations (initial differences) within specs, effective rolling radiuses of the respective tires (values obtained by dividing a distance which has been traveled by a single rotation by $2\pi$) are not necessarily identical to one another even though all of the tires have normal internal pressures. This will result in variations in the rotational angular velocities Fi of the respective tires. Thus, there is a method for eliminating the effect of initial differences from rotational angular velocities Fi, for example. In this method, first, the following initial correction coefficients K1, K2, K3 are calculated:

$$K1=F1/F2 \tag{1}$$

$$K2=F3/F4 \tag{2}$$

$$K3=(F1+K1*F2)/(F3+K2*F4) \tag{3}$$

Then, new rotational angular velocities F1i where the effect of the initial differences has been eliminated are determined to satisfy the following equations (4) to (7):

$$F1_1=F1 \tag{4}$$

$$F1_2=K1*F2 \tag{5}$$

$$F1_3=K3*F3 \tag{6}$$

$$F1_4=K2*K3*F4 \tag{7}$$

where the initial correction coefficient K1 is a coefficient for correcting the difference in effective rolling radius due to the initial difference between the front left and front right tires, the initial correction coefficient K2 is a coefficient for correcting the difference in effective rolling radius due to the initial difference between the rear left and rear right tires, and the initial correction coefficient K3 is a coefficient for correcting the difference in effective rolling radius due to the initial difference between the front left and rear left tires. Wheel speeds Vi of tires of the respective wheels are calculated based on the respective values F1i.

In the system for detecting decrease in tire air-pressure according to this embodiment, a tire deflation judgment value DEL is used to detect a decrease in tire air-pressure, which is a value obtained by subtracting the sum of signals from a pair of wheels on a diagonal from the sum of signals from the other pair of wheels on another diagonal and using the ratio between the obtained difference and the average value of the two sums, which is expressed as the following equation (8):

$$DEL=\{(V1+V4)/2-(V2+V3)/2\}/\{(V1+V2+V3+V4)/4\}\times 100(\%) \quad (8)$$

where V1-V4 represent wheel speeds of front left tire, front right tire, rear left tire and rear right tire, respectively.

The system for detecting decrease in tire air-pressure according to this embodiment comprises, as shown in FIG. 2, rotational velocity sensors 1, a RAM2$d$ that serves as the average preparation buffer BF for storing, for example, tire deflation judgment values DEL that are obtained by calculations according to the foregoing equation (8), a nonvolatile memory 2$e$ into which an average value of the foregoing judgment values and the number of the judgment values (referred to as "the number of samples") are written, and a CPU2$b$.

Upon completion of a drive of the vehicle (turn off of the engine), the CPU2$b$ writes the average value of an arbitrary number of judgment values stored in the aforementioned average preparation buffer BF and the foregoing number of samples into the nonvolatile memory 2$e$, expands the average value that has been written into the foregoing nonvolatile memory 2$e$ in duplicate which corresponds to the foregoing number of samples, and compares the average value of a prescribed number (6 in this embodiment) of judgment values with a threshold value, thereby judging whether or not a decrease in tire air-pressure occurs.

Figure 3:
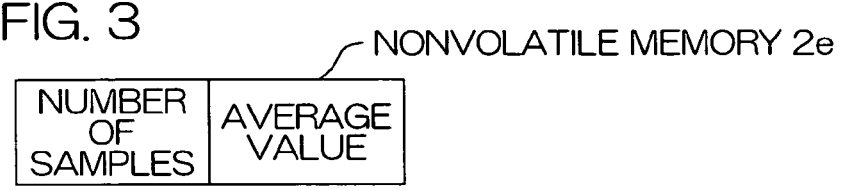
FIG. 3 is a diagram showing one example of the construction of a nonvolatile memory 2e.

The nonvolatile memory 2$e$ includes, as FIG. 3 shows, an area into which the average value of the foregoing judgment values is written and an area into which the number of samples is written.

Figure 4:
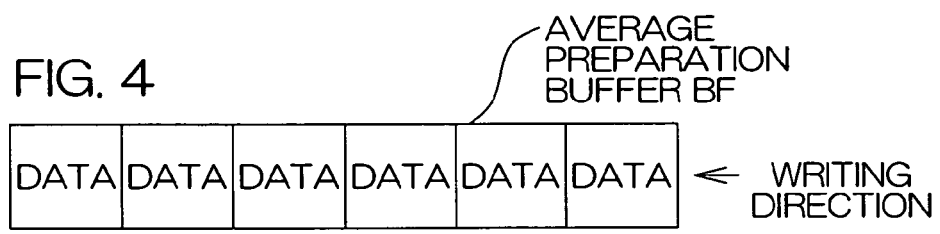
FIG. 4 is a diagram showing one example of the construction of an average preparation buffer BF.

The average preparation buffer BF includes, as FIG. 4 shows, areas into which a prescribed number (6 in this embodiment) of judgment values are written as data. The foregoing average preparation buffer BF is the so-called first-in first-out type memory. When the number of data exceeds 6, data that have been put in earlier flow out. Accordingly, the number of stored data is always 6 or less.

Figure 5:
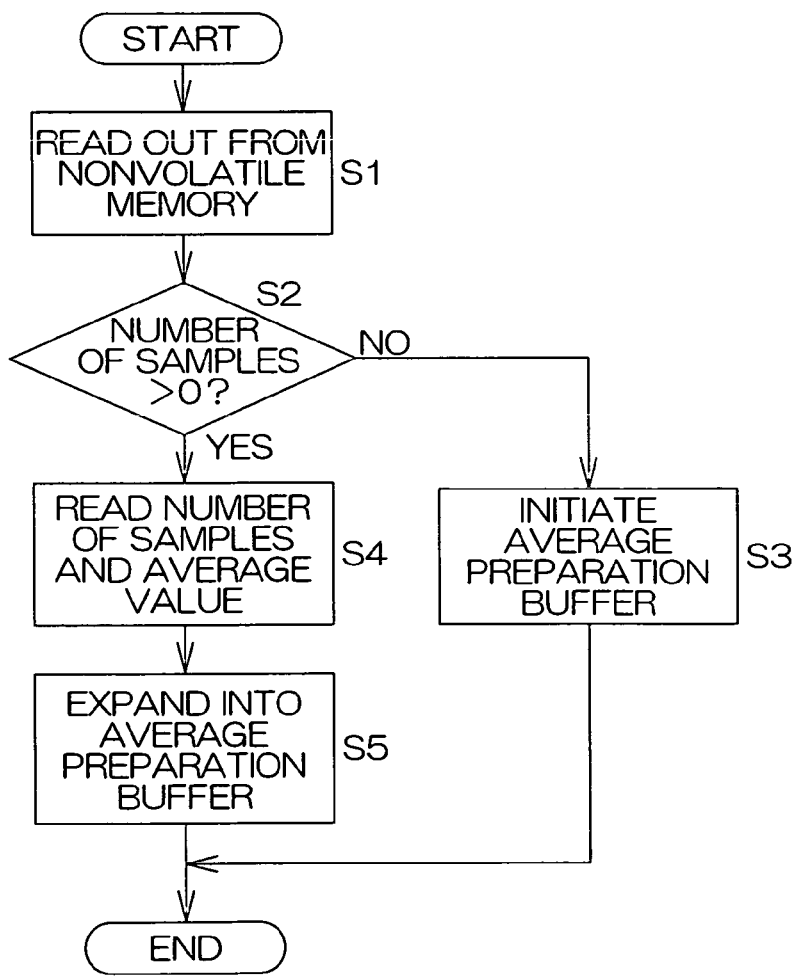
FIG. 5 is a flowchart illustrating a processing in which an average value stored into the volatile memory 2e after a start of a vehicle is expanded in duplicate corresponding to the number of samples in the average preparation buffer BF.

FIG. 5 is a flowchart illustrating a processing performed by the CPU2$b$, in which, after a start of the vehicle, the average value written into the volatile memory 2$e$ is expanded in duplicate corresponding to the number of samples into the average preparation buffer BF.

Figure 6:
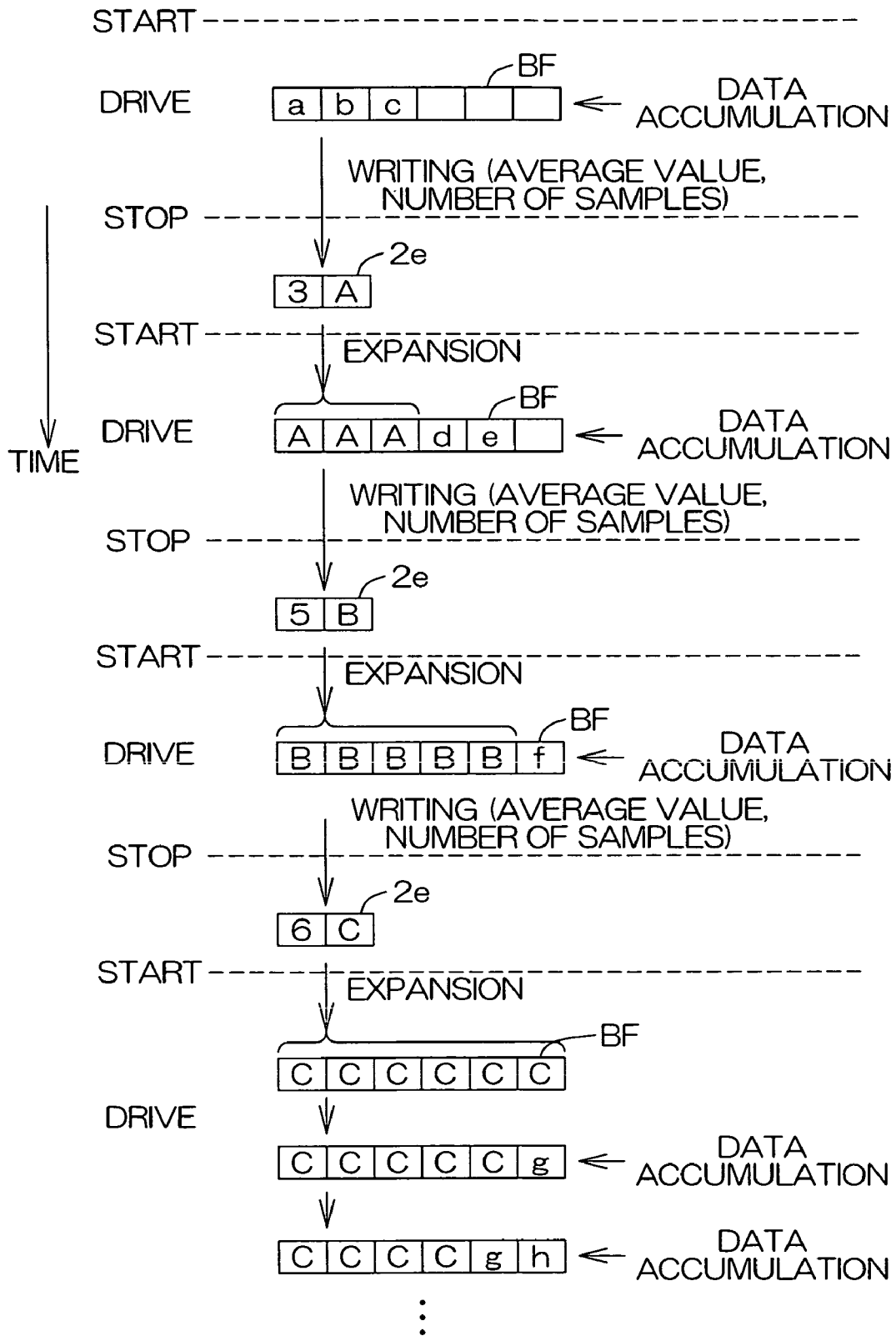
FIG. 6 is a time chart showing transition of data stored by the average preparation buffer BF and the nonvolatile memory 2e in accordance with the behavior of the vehicle.

FIG. 6 is a time chart specifically showing a transition of data stored in the average preparation buffer BF and the nonvolatile memory 2$e$.

Hereinafter the flow of the processing in FIG. 5 will be described referring to the time chart in FIG. 6.

First, the CPU2$b$ reads out the stored contents of the nonvolatile memory 2$e$ (Step S1), and finds the number of samples that are stored (Step S2).

When the number of samples is 0 (which corresponds to a case where the vehicle is driven for the first time), the CPU2$b$ initializes the average preparation buffer BF (Step S3) to complete the processing.

When the number of samples is 1 or more, the CPU2$b$ reads the number of samples and the average value (Step S4), and expands the average value into the average preparation buffer BF in duplicate corresponding to the number of samples (Step S5).

One example of the expansion is shown in FIG. 6. Suppose that the number of samples is 3 and the average value is a numerical value A, for example. Then the first three data areas are filled with the figures A, A, A (see FIG. 6). Or, if the number of samples is 5 and the average value is a numerical value B, the first five data areas are filled with the figures B, B, B, B, B(See FIG. 6).

After the average preparation buffer BF is filled with a predetermined number of data in the foregoing manner, the vehicle continues driving, while data of judgment values (a, b, c, d, e and the like) are accumulated at constant time intervals (for example, every 5 seconds).

Figure 7:
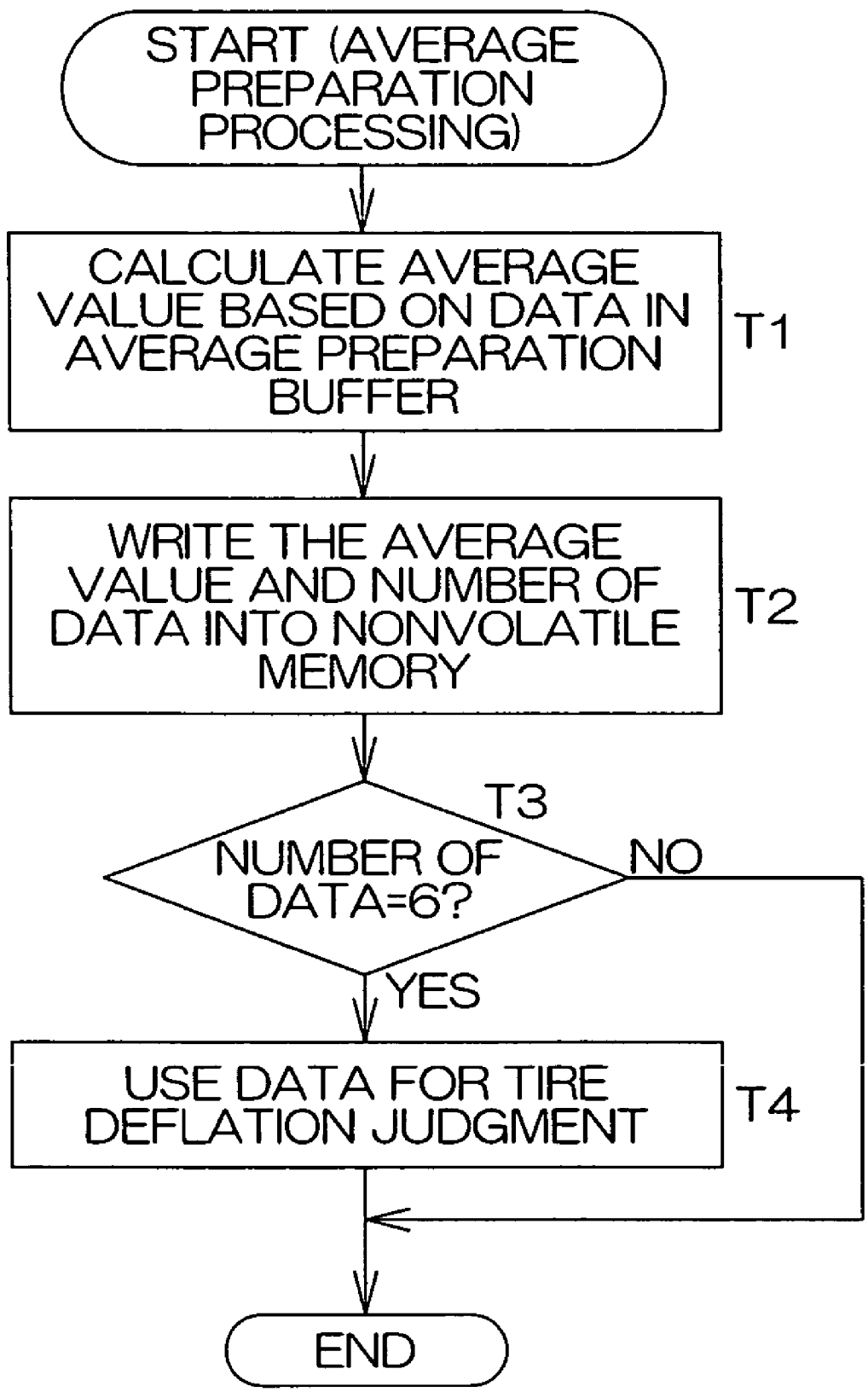
FIG. 7 is a flowchart illustrating a processing for writing an average value of an arbitrary number of judgment values stored in the foregoing average preparation buffer BF together with the aforementioned number into the nonvolatile memory 2e upon completion of a drive of the vehicle.

FIG. 7 is a flowchart illustrating a processing performed by the CPU2$b$ upon completion of a drive of the vehicle, in which the average value of an arbitrary number of judgment values stored in the average preparation buffer BF and the number of samples are written into the nonvolatile memory 2$e$.

Meanwhile, the processing is performed on the premise that the power source of the CPU2$b$ is kept on for a while even after the completion of a drive of the vehicle, and therefore no interference is caused in performing the predetermined processing.

First, an average value is calculated based upon an arbitrary number (the number may be the prescribed number 6 or any number less than 6) of judgment values that are stored in the average preparation buffer BF (Step T1). Then, the obtained average value and the number of the judgment values are written into the nonvolatile memory 2$e$ (Step T2: See FIG. 6).

When the CPU2$b$ recognizes that six judgment values are stored in the average preparation buffer BF (Step T3), it uses the judgment values for tire deflation judgment (Step T4). The tire deflation judgment is performed, for example, by comparing the average value of the 6 judgment values with a threshold value at constant time intervals (e.g. every 5 seconds). When only less than 6 judgment values are stored in the average preparation buffer BF (NO in Step T3), they are not used for the tire deflation judgment.

As described above, in the present invention, since judgment values are stored in the nonvolatile memory 2$e$ prior to a drive of the vehicle so as to be expanded into the average preparation buffer BF, tire deflation judgment can be accomplished even if the number of judgment values that permits calculation of the average value cannot be obtained during the drive. That is, even when a drive is discontinued, calculation of the average value is possible using judgment values that are obtained during the drive before it is discontinued together with judgment values calculated during the subsequent drive.

Furthermore, the present invention has the following advantageous effect.

The methods of detecting decrease in tire air-pressure in the prior art do not include such a nonvolatile memory 2$e$ that stores only the number of samples and the average value.

The nonvolatile memory in the prior art has a structure similar to the average preparation buffer BF, in other word, it is a memory that has a prescribed number (6 in this embodiment) of data areas for taking the average thereof. That is, the number of items to be written into the conventional nonvolatile memory is the same as that of the average preparation buffer BF. Accordingly, as the prescribed number increases, more judgment values need to be written at the same time. For this reason, a redundant capacity is required for a nonvolatile memory 2$e$.

On the other hand, according to the present invention, the number of items to be written is two including an average value and the number of samples, which are the required minimum items for the average calculation. Accordingly, only a minimum capacity is required for the nonvolatile memory 2e, which leads to the advantageous effect that the size of the memory construction is smaller than the conventional one.

In addition, regarding the timing of storing data into (rewriting) the nonvolatile memory, for example, in a conventional system for detecting decrease in tire air-pressure that allows acquirement of judgment values every 5 seconds, writing into the nonvolatile memory is also effected every 5 seconds. This causes the number of times of writing into the nonvolatile memory to be too many, shortening the life (about 100 thousand times of writings) of the memory. For example, when writing into the nonvolatile memory occurs every 5 seconds, the nonvolatile memory is only usable for 500 thousand seconds =140 hours.

On the other hand, in the present invention, the timing of writing into the nonvolatile memory 2e is limited as only when each drive of the vehicle is completed. For this reason, the frequency of writing into the nonvolatile memory 2e is reduced by far as compared to the conventional cases, so that the nonvolatile memory 2e is usable for longer period.

Incidentally, while the timing of writing into the nonvolatile memory 2e is set to be when each drive of the vehicle is completed according to the present invention, another embodiment in which writing is effected at a specific minute and second of every hour is of course adoptable.

In addition, writing into the nonvolatile memory 2e may be effected at regular distance intervals or regular time intervals from the start of each drive. However, setting the timing of writing to be when each drive of the vehicle is completed has the following advantage: Turn off of the engine is an event that happens without exception. When the timing of writing is set, for example, to be at a specific minute and second of every hour, watching the clock, determination of the minute and second and determination whether the values have been renewed or not after the writing at the minute and second of the previous hour are necessary. When compared with making such determinations, the program can be simpler when determination is made only once at each time when the vehicle stops or the engine is turned off.

Meanwhile, while in the present embodiment, values expressed as the equation (8) are used as the judgment values for detecting decrease in tire air-pressure, the judgment values may be other ones, for example, ratios such as V1/V2, V3/V4 and the like (where V1-V4 represent wheel speeds of the front left tire, front right tire, rear left tire and rear right tire, respectively). In addition, while in this embodiment, the time interval between calculations of judgment values is 5 seconds and the average value of 6 judgment values is calculated, implementation of the present invention is not limited to these, but other time intervals and/or numbers of judgment values may be employed where appropriate. In addition, the average value of judgment values may be a simple average or weighted average which is calculated by assigning larger weights to more recent judgment values.

What is claimed is:

1. A process of detecting decrease in tire air-pressure based on wheel rotational velocities obtained from tires mounted on a vehicle, which comprises the steps of:
    detecting wheel rotational velocities of the respective tires;
    repeatedly performing a relative comparison between the detected wheel rotational velocities to thereby obtain judgment values for decrease in tire air-pressure;
    storing the judgment values in an average preparation buffer;
    calculating an average value of the judgment values stored in the average preparation buffer;
    writing the average value and the number of the judgment values into a nonvolatile memory at a predetermined timing;
    expanding the average value that is written in the nonvolatile memory into the average preparation buffer in duplicate corresponding to the number of judgment values;
    calculating a subsequent average value of a prescribed number of judgment values that are stored in the average preparation buffer;
    comparing the subsequent average value with a predetermined threshold value, to thereby obtain a judgment of whether or not a decrease in tire air-pressure has occurred; and
    providing notification of the judgment of whether or not a decrease in tire air-pressure has occurred.

2. The process of detecting decrease in tire air-pressure according to claim 1, wherein the predetermined timing is when a drive of the vehicle is completed.

3. The method of detecting decrease in tire air-pressure according to claim 2, wherein the average value written in the nonvolatile memory is expanded into the average preparation buffer after a start of a subsequent drive of the vehicle.

4. A system for detecting decrease in tire air-pressure based on wheel rotational velocities obtained from tires mounted on a vehicle, which comprises:
    rotational velocity sensors for detecting wheel rotational velocities of The respective tires;
    judgment value calculating means for repeatedly performing a relative comparison between the detected wheel rotational velocities to thereby obtain judgment values for decrease in tire air-pressure;
    an average preparation buffer for storing the judgment values;
    a nonvolatile memory into which an average value of the judgment values and the number of samples are written;
    writing means for writing the average value of the judgment values stored in the average preparation buffer and the number thereof into the nonvolatile memory at a predetermined timing;
    expanding means for expanding the average value written in the nonvolatile memory into the average preparation buffer in duplicate corresponding to the number of the judgment values;
    judging means for obtaining the average value of a prescribed number of judgment values stored in the average preparation buffer so as to compare the average value with a predetermined threshold value, to thereby obtain a judgment of whether or not a decrease in tire air-pressure has occurred; and
    means for providing notification of the judgment of whether or not a decrease in tire air-pressure has occurred.

5. The system for detecting decrease in tire air-pressure according to claim 4, wherein the predetermined timing is when a drive of the vehicle is completed.

6. The system for detecting decrease in tire air-pressure according to claim 5, wherein the average value written into the nonvolatile memory is expanded into the average preparation buffer after a start of a subsequent drive of the vehicle.

7. A tire deflation judging program provided in computer-readable memory of a system for detecting decrease in tire air-pressure based on wheel rotational velocities obtained from tires mounted on a vehicle, the program, when executed, carrying out a method comprising the steps of:

detecting wheel rotational velocities of the respective tires;

repeatedly performing a relative comparison between the detected wheel rotational velocities to thereby obtain judgment values for decrease in tire air-pressure;

storing the judgment values in an average preparation buffer;

calculating an average value of the judgment values stored in the average preparation buffer;

writing the average value and the number of the judgment values into a nonvolatile memory at a predetermined timing;

expanding the average value that is written in the non-volatile memory into the average preparation buffer in duplicate corresponding to the number of judgment values;

calculating a subsequent average value of a prescribed number of judgment values that are stored in the average preparation buffer;

comparing the subsequent average value with a predetermined threshold value, to thereby obtain a judgment of whether or not a decrease in tire air-pressure has occurred; and providing notification of the judgment of whether or not a decrease in tire air-pressure has occurred.

* * * * *